No. 718,062. PATENTED JAN. 6, 1903.
J. WEED.
AUTOMATIC GUN.
APPLICATION FILED SEPT. 3, 1901.
NO MODEL. 2 SHEETS—SHEET 1.
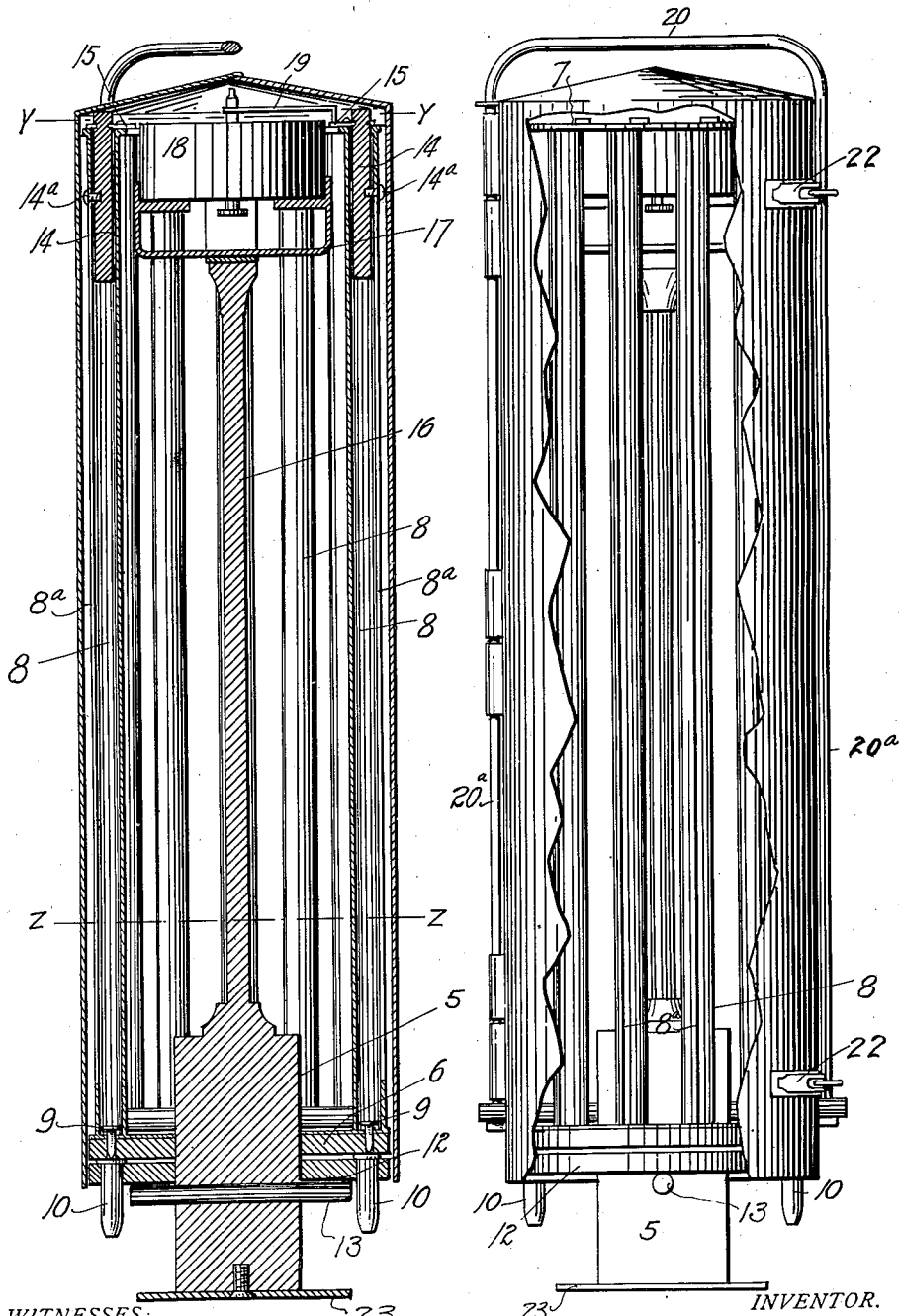
WITNESSES: FIG. 2 FIG. 1 INVENTOR. James Weed.
BY
ATTORNEY.

No. 718,062. PATENTED JAN. 6, 1903.
J. WEED.
AUTOMATIC GUN.
APPLICATION FILED SEPT. 3, 1901.
NO MODEL. 2 SHEETS—SHEET 2.
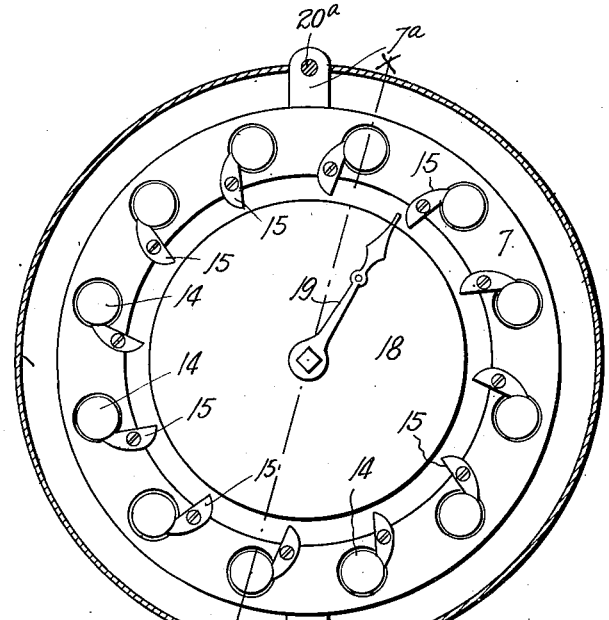
FIG. 3.
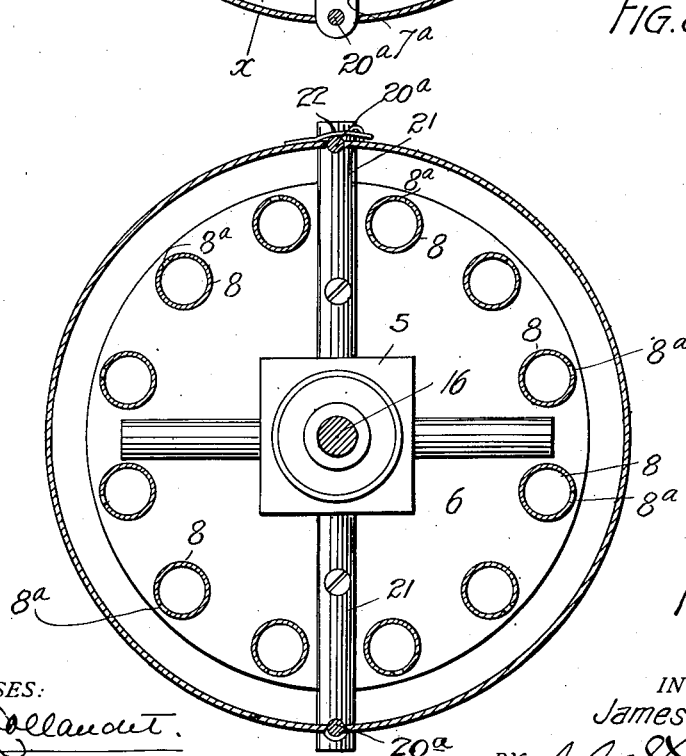
FIG. 4.
WITNESSES:
INVENTOR.
James Weed.
BY 
ATTORNEY.

UNITED STATES PATENT OFFICE.

JAMES WEED, OF RAWLINS, WYOMING, ASSIGNOR OF TWO-THIRDS TO JOHN LEWIS AND AARON A. BROWN, OF RAWLINS, WYOMING.

AUTOMATIC GUN.

SPECIFICATION forming part of Letters Patent No. 718,062, dated January 6, 1903.

Application filed September 3, 1901. Serial No. 74,109. (No model.)

*To all whom it may concern:*

Be it known that I, JAMES WEED, a citizen of the United States of America, residing at Rawlins, in the county of Carbon and State of Wyoming, have invented certain new and useful Improvements in Automatic Guns; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in automatic guns, my object being to provide an apparatus adapted to frighten wild animals—as coyotes, wolves, and mountain-lions—and thereby protect domestic animals. It is constructed to be located in any convenient place about a corral or other place where the animals to be protected—as sheep, for instance—are kept. The construction is also such that when in use it automatically explodes a cartridge at predetermined intervals through the instrumentality of clock mechanism.

The invention will now be described in detail, reference being made to the accompanying drawings, in which is illustrated an embodiment thereof.

In the drawings, Figure 1 is a side elevation of my improved automatic gun, the outer casing or housing being partly broken away. Fig. 2 is a vertical longitudinal section taken on the line $x\,x$, Fig. 3. Fig. 3 is a horizontal section taken on the line $y\,y$, Fig. 2. Fig. 4 is a similar section taken on the line $z\,z$, Fig. 2.

The same reference characters indicate the same parts in all the views.

Let the numeral 5 designate a block forming a part of the lower framework of the device. To this block, which, as shown in the drawings, is square in horizontal section, is made fast a disk 6, which surrounds the block. This disk is connected with a ring 7, located at the top of the device, by a number of open-ended tubes 8, whose upper extremities register with openings formed in the ring and whose lower extremities surround openings in which are movably located small devices 9, which pass through the openings in the disk 6 and rest on the cartridges 10 to be exploded. These cartridges are mounted in a disk 12, provided with openings therefor suitably arranged. These openings are just large enough to allow the body part of the cartridges to slip easily therethrough until the rim is reached which supports the cartridge in place. The disk 12 is slidable on the block 5, whereby it is allowed to pass down far enough below the disk 6 to permit the insertion of the cartridges and the removal of the shells. When in position for use, the disk 12 is held in place by a pin 13, passed through an opening in the block 5 below the disk 12. This pin is removable to permit the disk 12 to slide on the block for the purpose stated.

There may be any desired number of tubes 8, and they are arranged in a circle struck from the center of the block 5. Within each tube is located a weight 14, whose upper extremity is provided with a circumferential groove adapted to be engaged by a trigger or a dog 15, pivotally mounted on the ring 7. To the top of the block 5 is attached a central rod or column 16, to whose upper extremity is secured a support 17, upon which rests a clock mechanism 18, provided with a hand 19, which as it moves around the face of the dial is adapted to successively engage the triggers 15 and actuate them sufficiently to release the weights 14, which then drop into the tubes to engagement with the devices 9 and explode the cartridges at predetermined intervals. As shown in the drawings, twelve tubes are arranged around the circle at equal intervals. Hence if the weight is set or supported in operative relation by a trigger a cartridge would be exploded every hour for twelve successive hours. If it is desired to explode them every half or quarter hour, more tubes, weights, and triggers must of course be employed. Each weight is provided with a projection 14ª, which passes through a vertical slot 8ª, formed in the tube. This projection is for convenience in raising the weight in the tube after it has fallen to engagement with the device 9.

The ring 7 is provided with two lugs or ears

7ᵃ, which project outwardly therefrom on opposide sides and are provided with openings through which pass the vertical arms 20ᵃ of an inverted-U-shaped rod 20. The lower extremities of these arms 20ᵃ pass through openings formed in projections 21, secured to the disk 6. These arms are secured in place below the projections 21 by nuts screwed upon the threaded lower extremities of the rods. A two-part casing or housing, adapted to inclose the mechanism at the top and sides to prevent the entrance of rain, snow, and dirt, is hinged to one member 20ᵃ of the rod, whereby the housing may be opened and closed at will. One part of this housing is provided with metal straps 22, adapted to pass outside of the other rod member 20ᵃ, and engaged staples attached to the other housing part. The hasp of a padlock may be passed through each of the staples outside of the strap to lock the housing in a closed position, whereby unauthorized persons are prevented from tampering with the mechanism.

The lower extremity of the block 5 is provided with a plate 23, adapted to form the support for the disk 12 when the latter is in the lowered position.

In order to use the device, it is only necessary to open the housing, wind up and set the clock, raise the weights, set the triggers, and insert the cartridges. The housing is then closed and locked and the device hung in any advantageous position with reference to the location of the domestic animals to be protected. Then as the hand 19 of the clock moves around the dial it will actuate the triggers and release the weights in succession, and the cartridges will be exploded at regular predetermined intervals, as aforesaid.

It will be observed from the foregoing description and from inspection of the drawings that the tubes 8 form guides only for the weights. Hence instead of tubes guides of any suitable construction may be employed, the only requirement being that the weights are properly directed as they fall to explode the cartridges.

Having thus described my invention, what I claim is—

1. In an automatic gun, the combination with a suitable frame, a number of vertical tubes mounted on the frame, cartridges supported at the lower extremities of the tubes, weights slidable in the tubes, triggers for supporting the weights in the tubes above the cartridges, and means for automatically and successively actuating the triggers to release the weights, whereby the latter are allowed to fall in the tubes and explode the cartridges at predetermined intervals.

2. In an automatic gun, the combination with a suitable frame, of a number of open-ended tubes mounted therein and arranged in a circle, a cartridge-holder located at the lower extremities of the tubes and so arranged that the cartridges when in position are in line with the tubes, means for supporting the weights in the tubes above the cartridges, and means for automatically actuating the weight-supporting means, to release the weights, whereby the latter are allowed to fall a sufficient distance to explode the cartridges.

3. In an automatic gun, the combination with a suitable frame, of a series of tubes mounted thereon and arranged in a circle, a cartridge-holder located below the tubes and constructed to support the cartridges in alinement with the tubes, weights slidable in the tubes which are provided with slots, the weights having projections extending through the slots for convenience in raising the weights, triggers mounted on the frame and arranged to support the weights in the tubes above the cartridges, a clock mechanism mounted in proximity to the triggers, and a hand actuated by said mechanism to operate the triggers and release the weights, the arrangement being such that as the weights fall in the tubes, the cartridges are exploded.

4. In an automatic gun, the combination with a suitable frame, of a lower apertured disk, an upper ring having openings in line with the openings in the disk, open-ended tubes connecting the disk and the ring, and in alinement with the openings therein, movable cartridge-exploding devices located in the disk-openings, a cartridge-holder mounted on the frame below the disk and provided with cartridge-apertures in line with the openings in the disk, whereby the cartridges are engaged by the exploding devices carried by the disk, means for supporting the weights in the tubes, above the exploding devices, and means for automatically and successively releasing the weights for the purpose set forth.

5. In an automatic gun, the combination of a block, a disk made fast thereto and provided with openings, cartridge-exploding devices mounted in said openings, a cartridge-holder adjustable on the block, and provided with cartridge-openings in line with the exploding devices, tubes secured at their lower extremities to the disk, and in alinement with the exploding devices, a ring to which the upper extremities of the tubes are attached, said ring being provided with openings registering with the openings in the tubes, weights slidable in the tubes, triggers mounted on the ring and arranged to support the weights above the exploding devices, and means for automatically actuating the triggers to release the weights.

6. In an automatic gun, the combination with a suitable frame, of a number of vertical guides mounted on the frame, a cartridge-holder mounted on the frame at the lower extremities of the guides, weights supported above the cartridge-holder and slidable in the guides, triggers mounted on the frame and normally supporting the weights, and means for automatically and successively actuating the triggers to release the weights whereby they are allowed to drop and explode the cartridges at predetermined intervals.

7. In an automatic gun, the combination with a suitable frame, of a cartridge-holder mounted on the frame, cartridge-exploding devices mounted above the holder and in line with the cartridges therein, weights supported above the exploding devices, weight-guides between the exploding devices and the weights and in which the latter are slidable, triggers pivotally mounted on the frame and arranged to support the weights above the cartridge-exploding devices, and means for automatically and successively actuating the triggers to release the weights.

8. In an automatic gun, the combination with a cartridge-holder, weights supported above the said holder, a number of vertical guides in which the weights are slidable, said guides being located between the weights and the cartridges, and arranged in a circle, triggers pivotally mounted on the frame and arranged to support the weights in line with the guides, means for automatically and successively actuating the triggers to release the weights, and a suitable housing inclosing the said mechanism, substantially as described.

9. In a device of the class specified, a series of cartridge-supports, discharging-hammers therefor, means for guiding and supporting said hammers, and means for releasing said hammers, at predetermined intervals of time.

10. In a device of the class described, a series of cartridge-supports, discharging-hammers, means for guiding and supporting said hammers, a clockwork mechanism, and an arm carried thereby for successively releasing said hammers.

11. In a device of the class specified, an annular series of cartridge-supports, discharging-hammers, means for guiding the hammers, hammer-supports, a clockwork mechanism, and a revoluble arm carried by the clockwork mechanism and adapted to successively engage and move the hammer-supports to releasing positions.

In testimony whereof I affix my signature in presence of two witnesses.

JAMES WEED.

Witnesses:
M. HEALY,
CHAS. COBB.